(12) United States Patent
Park et al.

(10) Patent No.: US 8,804,223 B2
(45) Date of Patent: Aug. 12, 2014

(54) LIGHT BEAM SCANNING DEVICE WITH A SILICON MIRROR ON A METAL SUBSTRATE

(75) Inventors: Jaehyuk Park, Tsukuba (JP); Jun Akedo, Tsukuba (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 34 days.

(21) Appl. No.: 13/498,454

(22) PCT Filed: Sep. 9, 2010

(86) PCT No.: PCT/JP2010/065550
§ 371 (c)(1),
(2), (4) Date: Mar. 27, 2012

(87) PCT Pub. No.: WO2011/037025
PCT Pub. Date: Mar. 31, 2011

(65) Prior Publication Data
US 2012/0194890 A1    Aug. 2, 2012

(30) Foreign Application Priority Data
Sep. 28, 2009 (JP) ................................. 2009-222888

(51) Int. Cl.
*G02B 26/08* (2006.01)
(52) U.S. Cl.
USPC .................... 359/199.1; 359/221.2; 359/224.1
(58) Field of Classification Search
USPC .......... 359/199.1, 198.1, 200.8, 212.1, 213.1, 359/214.1, 221.2, 223.1, 224.1
See application file for complete search history.

(56) References Cited

U.S. PATENT DOCUMENTS

| 5,959,760 A | 9/1999 | Yamada et al. | |
| 6,643,045 B2 * | 11/2003 | Fujita et al. | 359/213.1 |
| 7,173,748 B2 * | 2/2007 | Hara et al. | 359/221.2 |
| 7,551,339 B2 * | 6/2009 | Mochizuki | 359/224.1 |

(Continued)

FOREIGN PATENT DOCUMENTS

| JP | 10-104543 A | 4/1998 |
| JP | 10-197819 A | 7/1998 |

(Continued)

OTHER PUBLICATIONS

International Search Report for PCT/JP2010/065550 dated Oct. 5, 2010.

*Primary Examiner* — Frank Font
(74) *Attorney, Agent, or Firm* — Birch, Stewart, Kolasch & Birch, LLP

(57) ABSTRACT

An optical scanning device, having: a substrate main body; two cantilever beams protruded from the respective side portion of one side of the substrate main body; a mirror supported by torsion bars from the respective side, between the cantilever beams; a drive source to causes the substrate main body to vibrate; and a light source to project light onto the mirror, wherein a fixed end of the substrate main body is fixed to a supporting member, on the opposite side from the mirror side, and wherein the mirror resonantly vibrates according to vibration applied to the substrate by the drive source, thereby to change a direction of reflection light of the light projected onto the mirror from the light source according to the vibration of the mirror, characterized in that a Si mirror is attached to and fixed on the mirror.

5 Claims, 13 Drawing Sheets

(56) References Cited

U.S. PATENT DOCUMENTS

| | | | |
|---|---|---|---|
| 8,125,699 B2 * | 2/2012 | Akedo et al. | 359/199.1 |
| 8,199,389 B2 * | 6/2012 | Eiji et al. | 359/213.1 |
| 8,305,669 B2 * | 11/2012 | Akedo et al. | 359/199.1 |
| 8,416,484 B2 * | 4/2013 | Kanno et al. | 359/224.1 |
| 8,482,832 B2 * | 7/2013 | Kotera et al. | 359/224.1 |
| 2002/0118429 A1 | 8/2002 | Miyajima et al. | |
| 2006/0245009 A1 | 11/2006 | Akiyama et al. | |
| 2010/0014140 A1 | 1/2010 | Akedo et al. | |
| 2010/0014143 A1 * | 1/2010 | Kanno et al. | 359/224.1 |

FOREIGN PATENT DOCUMENTS

| | | |
|---|---|---|
| JP | 11-52278 A | 2/1999 |
| JP | 2002-182136 A | 6/2002 |
| JP | 2006-292891 A | 10/2006 |
| JP | 2007-292919 A | 11/2007 |
| JP | 2008-310043 A | 12/2008 |
| WO | 2008/044470 A1 | 4/2008 |

* cited by examiner a TORSIONAL RESONANCE OF MIRROR (fm)
b DIVIDED RESONANCE VIBRATION OF FRAME (fb)

--Prior Art--

--Prior Art--

--Prior Art--

--Prior Art--

LIGHT BEAM SCANNING DEVICE WITH A SILICON MIRROR ON A METAL SUBSTRATE

TECHNICAL FIELD

The present invention relates to an optical scanner which performs scans by scanning of an optical beam, and specifically to an optical scanning device which has a structure of a micromirror supported by torsion beams (torsion bars) to oscillate, thereby to polarize the optical beam, and which is improved in dynamic deformation of the mirror.

BACKGROUND ART

In recent years, optical scanners which scan optical beams of laser light or the like have been used as optical instruments, such as bar code readers, laser printers, head mounted displays, and the like, or as optical intake devices of input devices, such as infrared cameras, and the like. For those types of optical scanners, there are proposed optical scanners having a structure of oscillating a micromirror which is obtained via silicon micromachining technology.

For example, Patent Literature 1 (JP-A-11-52278 ("JP-A" means unexamined published Japanese patent application)) discloses an optical scanner having a silicon micromirror, as shown in FIG. 16 (referred to as "Conventional Art 1" in below). This optical scanner is manufactured using silicon micromachining technology and is formed in an overall size of several millimeters square. A supporting substrate 1 is formed with a rectangular sheet having a recessed portion 1a formed in a center portion thereof. A mirror 2 which is formed from a silicon sheet is internally supported in this recessed portion 1a. Two torsion bars 3a and 3b which are formed integrally with the mirror 2 protrude from two ends thereof, respectively. Distal end portions of these torsion bars 3a and 3b are fixed to the supporting substrate 1, and are connected to pads 4a and 4b, respectively. As a result, the mirror 2 is able to be swung or oscillated between the planar direction of the mirror and a direction which is perpendicular to the mirror surface, by the twisting of the torsion bars 3a and 3b. Impurity ions are implanted or diffused at least at peripheral areas or at the surface of the mirror 2, or alternatively, these areas may be covered by aluminum or silver or by an electrically-conductive organic thin film, resulting in these areas to form an electrode 5 which is electrically conductive.

In contrast, fixed electrodes 7a and 7b are located at the respective side position of the recessed portion 1a on the surface of the supporting substrate 1 via an insulator 6. These fixed electrodes 7a and 7b are formed by semiconductors or electrically-conductive materials composed of organic materials, and inner side edge portions of each of these fixed electrodes 7a and 7b are placed adjacent to the electrode 5 at the respective side edge of the mirror 2. Thus, a condenser is formed between the electrode 5 and the respective fixed electrodes 7a and 7b.

When a given voltage is applied between a pad 8a of one fixed electrode 7a and the pads 4a and 4b of the torsion bars 3a and 3b, this voltage is applied to the mirror electrode 5 which is connected to the pads 4a and 4b, and electric charges having mutually opposite polarities are accumulated on the surface of the fixed electrode 7a and the mirror electrode 5 so as to form a condenser. Electrostatic attraction then begins to work between the fixed electrode 7a and the mirror electrode 5, and the mirror 2 starts to rotate. Then, after the mirror 2 has returned to its original position, then by applying a voltage between the other fixed electrode 7b on the opposite side and the mirror electrode 5, the mirror 2 is again rotated, this time in the opposite rotation direction. By performing this type of operation repeatedly, the mirror 2 makes a swinging motion (oscillation motion) by repeating a motion of rotating between the positions of maximum rotation in the anticlockwise direction and the clockwise direction.

Further, Patent Literature 2 (JP-A-10-197819) describes an optical scanner in which a micromirror obtained by means of silicon micromachining technology is swung or oscillated (referred to as "Conventional Art 2" in below).

As shown in FIG. 17, this optical scanner is provided with: a sheet-shaped micromirror 1, which is to reflect light; a pair of rotation supporting bodies 2, which are positioned on a straight line and support the micromirror 1 from the respective side thereof; a frame 3, to which the pair of rotation supporting bodies 2 are connected, and which surrounds the periphery of the mirror 1; and a piezoelectric element 4, which applies translational motion to the frame 3. In addition, this optical scanner is structured such that the center of gravity of the mirror 1 is located at a position outside of on the straight line connecting the pair of rotation supporting bodies 2.

When a voltage is applied to the piezoelectric element 4, the piezoelectric element 4 is made to expand and contract, so as to vibrate in the Z axial direction. This vibration is transmitted to the frame 3. When the micromirror 1 is made to undergo a relative motion to the driven frame 3 and the vibration component in the Z axial direction is transmitted to the micromirror 1, because the micromirror 1 has left-right asymmetrical mass components with respect to the axis formed by the X-axis rotation supporting bodies 2, rotational moment is generated in the micromirror 1 centered on the X-axis rotation supporting bodies 2. In this manner, the translational motion which has been applied to the frame 3 by the piezoelectric element 4 is transformed into rotational motion centering on the X-axis rotation supporting bodies 2 of the micromirror 1.

Further, Patent Literature 3 (JP-A-10-104543) describes an optical scanning device (referred to as "Conventional Art 3" in below), as shown in FIG. 18. In this optical scanning device, beams 3 and 3 extend in mutually opposite directions from the respective side of a movable portion 2 in a vibrator 1, and are connected to two arms 4 and 4 of a fixed portion 6. Piezoelectric thin films 5 and 5 are provided respectively on the arms 4 and 4 of the fixed portion 6, and these piezoelectric thin films 5 and 5 are driven by the same signal which includes high-order vibration frequencies.

However, the above-described optical scanner of Conventional Art 1 is manufactured to be several millimeters square using silicon micromachining technology, and the electrode 5 is formed on at least peripheral areas or on the surface of the mirror 2 and the pads 4a and 4b are provided on the torsion bars 3a and 3b. In addition, it is necessary to place the respective fixed electrodes 7a and 7b and pads 8a and 8b at positions on the respective side of the surface of the supporting substrate 1 via the insulator 6.

In this manner, the electrode 5 is formed on at least peripheral areas or on the surface of the mirror 2, the pads 4a and 4b are formed on the torsion bars 3a and 3b, and the respective fixed electrodes 7a and 7b and pads 8a and 8b are formed at the respective side of the surface of the supporting substrate 1 via the insulator 6. As a result, the structure of this optical scanner is complex, and not only the causes for possible failures are increased, but the time period required for manufacturing is also increased, to lead to a problem of costs increased.

Further, in the optical scanner of the above-described Conventional Art 2, since a structure is employed in which translational motion applied to the frame 3 by the piezoelectric element 4 is transformed into rotational motion centering on the X-axis rotation supporting bodies 2 of the micromirror 1, it is necessary to shift the position of gravity center of the micromirror 1 to the torsion bars.

Moreover, the device also needs to have a certain thickness not only in the X-Y axial directions, but also in the Z axial direction, and it is difficult to reduce the thickness of this device.

Further, the optical scanning device of the above-described Conventional Art 3 has the drawback that a large torsion angle cannot be formed in the movable portion 2.

Namely, when a piezoelectric film is formed in the two narrow cantilever beams which support the two torsion bars protruding from the frame, the rigidity of this portion increases and vibration which is induced in the piezoelectric film is not transmitted efficiently to the torsion bar portions. As a result, the torsional vibration of the mirror becomes small. Moreover, unless the vibration characteristics of the vibration source formed by the two cantilever beams and the piezoelectric film which is formed thereon are matched precisely, the vibration amplitude of the torsional vibration of the mirror becomes suppressed, and, simultaneously, vibration modes other than the torsional vibration are superimposed, resulting in that accurate laser beam scanning cannot be achieved. Furthermore, in order to increase the area of the piezoelectric film portion to increase the drive force for the mirror, it is necessary to widen the width of the cantilever beams. Because of this, an unnecessary two-dimensional vibration mode is generated in the same cantilever beam, the vibration amplitude of the torsional vibration of the mirror becomes suppressed, and, simultaneously, vibration modes other than the torsional vibration are superimposed, resulting in such a problem that accurate laser beam scanning cannot be achieved. Moreover, because the width of the cantilever beams is restricted to a narrow width, the formation of the upper electrodes to drive the piezoelectric film formed on this portion is not readily due to the narrow width, resulting in such a problem that the yield in mass production is conspicuously affected.

FIG. 19 shows the same case as that of Conventional Art 3, and shows a structure in which a piezoelectric film is formed on two narrow-width cantilever beams which support two torsion bars protruded from a frame. The drive efficiency of the mirror scan angle was examined by a simulation calculation. The face where y=0 was taken as a plane of symmetry, and a half of this was used as a model.

FIG. 20 shows the torsion angle of a mirror having a structure in which a piezoelectric film is formed on two narrow-width cantilever beams which support two torsion bars protruded from the frame, as shown in FIG. 19. The drive voltage was set at 1V, while the characteristics of a PZT-5A which are typical parameters were used for the electrical characteristics of the piezoelectric body, and while the characteristics of SUS 304 were used for the material of the scanner frame main body. The torsion angle of the mirror was 0.63°.

Thus, as countermeasures to the problems in the above-described Conventional Arts 1 to 3, the applicant/inventors of this application has previously proposed an optical scanning device, as described in Patent Literature 4 (International Patent Publication No. WO2008/044470) (referred to as "Conventional Art 4" in below). This optical scanning device is one in which, using a simple structure, it is possible to efficiently generate torsional vibration in a mirror, by forming a piezoelectric actuator on a substrate having torsion bars which support the mirror, utilizing thin-film formation technology, such as an aerosol deposition method (AD method), a sputtering method, or a sol-gel method, and by generating torsional vibration in the mirror with the use of the vibration of the substrate. The present invention is attained, based on a further improvement of Conventional Art 4, and the fundamental matters such as the principle of generation of torsional vibration in the mirror, are the same as those of Conventional Art 4. Thus, the principle of generation of torsional vibration in the mirror, and the fundamental matters of the device, each according to Conventional Art 4, are described below in detail.

[Principle of Generating Torsional Vibration in Mirror]

As shown in FIG. 1, the basic structure of Conventional Art 4 includes: a substrate 10, which is formed by a substrate main body 20 and by two cantilever beams 19 and 19 protruded from the respective side portion at one end of the substrate main body; torsion bars 12 and 12, which are provided between the cantilever beams 19 and 19, so as to support a mirror 13 from the respective side thereof; a drive source 11, which is formed by a piezoelectric film or the like provided on the substrate main body 20; and a supporting member 16, which fixes a fixed end 21 of the substrate main body, at the opposite side to the mirror 13 side of the substrate main body. The torsion bars 12 which support the mirror 13 extend in a perpendicular direction (i.e. in the X axial direction) with respective to the axial direction of the cantilever beams 19.

As shown in FIG. 2, when a voltage is applied to the piezoelectric film which is the drive source 11, deflection or flexure is generated in the substrate main body 20 directly beneath the piezoelectric film in conjunction with the deflection of the piezoelectric film, and vibration is generated in the substrate main body 20. Namely, as shown in FIG. 2(a), when a positive voltage is applied to the piezoelectric film side, the piezoelectric film stretches, while conversely, as shown in FIG. 2(b), when a negative voltage is applied to the piezoelectric film side, the piezoelectric film contracts, thereby each generating vibration in the substrate 10.

At this time, the vibration generated in the substrate main body 20 is transmitted from the substrate main body 20 to the cantilever beams 19, so that a force is generated which imparts a rotational moment to the mirror 13 which is in a horizontal state and is supported by the torsion bars 12 shown in FIG. 1, thereby inducing torsional vibration.

[Placement of Drive Source]

As described with respect to Conventional Art 3, when the drive source 11 is provided on the torsion bars 12 and the cantilever beams 19 each of which are close to the mirror 13, it is not possible to cause the mirror 13 to vibrate at a large torsion angle.

In contrast to this, in Conventional Art 4, by forming a single piezoelectric film, which functions as the drive source 11, on the substrate main body 20, the rigidity of the two cantilever beams 19 and 19 is lowered and torsional vibration is efficiently induced in the mirror 13. At the same time, by providing only a single drive source 11 to drive the mirror 13, it is possible to solve the above-described problems of the inducing of unnecessary vibration modes and of a reduction in vibration amplitude, each of which is caused by irregularities or the like in the drive source 11. Moreover, by using the above-described two cantilever beams 19 and 19 to separate the portion, where the piezoelectric film, i.e. the drive source 11, is formed, from the mirror torsional vibration portion, which is formed by the mirror 13 and the torsion bars 12 supporting the mirror 13, the area of the piezoelectric film of the drive source 11 can be designed freely irrespective of the width of the cantilever beams 19, and it is possible to efficiently impart a large driving force by means of the mirror torsional vibration portion. Furthermore, formation of the electrodes to drive the piezoelectric film becomes also readily, and it is possible to increase the yield in industrial production.

FIG. 3 is a plan view showing the optical scanning device according to Conventional Art 4 which has a structure in which one piezoelectric film of the drive source 11 is formed on the substrate main body 20, and in which the face where y=0 is taken as a plane of symmetry, and only a half of this is utilized as a model. The dimensions of the mirror 13 and the dimensions of the torsion bars 12, the mounted position where the torsion bars 12 are mounted on the mirror 13 (i.e. the position of the center of gravity of the mirror 13), the shape of the substrate 10 as well as the method of support the same, and also the thickness and the total value of the area of the piezoelectric film, each of which provide the basic structure of the optical scanning device, are made the same as in Conventional Art 3. This optical scanning device only differs in the position where the piezoelectric film of the drive source 11 is formed.

FIG. 4 shows the torsion angle of the mirror 13 of the device, as shown in FIG. 3. The drive voltage was set at 1V, while the characteristics of a PZT-5A which are typical parameters were used for the electrical characteristics of the piezoelectric body, while SUS 304 characteristics were used for the material of the scanner frame main body. Basically, the resonance frequency in the present invention, as shown in FIG. 3, is substantially the same as that in Conventional Art 3, as shown in FIG. 18. However, while, in Conventional Art 3, the torsion angle of the mirror 13 was 0.63°, in Conventional Art 4 shown in FIG. 3, it was confirmed to have an approximately 4.3 times greater than the above torsion, namely, the torsion angle was 2.69° (80.7° at a conversion of 30V).

It is possible to position a plurality of vibration sources on a substrate in order to increase the scan amplitude of the mirror. However, in that case, because of irregularities in the mounted state due to the characteristics of the vibration sources or the mounted positions, or to the adhesion or film formation, it becomes apt to induce two-dimensional vibration to the substrate, which vibration is asymmetrical to the axis of symmetry in a perpendicular direction to the torsion bars supporting the mirror, which results in a deterioration in the scanning accuracy of the optical beam due to the torsional vibration of the mirror. In contrast to this, according to the present invention, torsional vibration is induced efficiently in the mirror even though there is only one vibration source, and it is possible to largely suppress reduction of scan jitter in the optical beam and occurrence of irregularity among products.

In order to obtain the maximum amplitude in the torsion angle of the mirror 13 at a fixed drive voltage, the placement of the drive source 11 to the mirror 13 has importance. When the drive source 11 is placed at a position away from the connecting position where the torsion bars 12 which support the mirror 13 connect to the cantilever beams 19, namely, in a part of the substrate main body 20, for example, in a center portion of the substrate main body 20, it is possible to cause the mirror 13 to vibrate with a large torsion angle.

Further, in the case where vibration is generated when the drive source 11 is placed at a position away from the connecting position where the torsion bars 12 which support the mirror 13 connect to the cantilever beams 19, the drive source 11 is positioned such that the minimum amplitude of the substrate vibration (i.e. the node of the vibration) would be obtained in the vicinity of the connecting position where the torsion bars 12 which support the mirror 13 connect to the cantilever beams 19.

Moreover, when the connecting portion between the cantilever beams 19 and the substrate main body 20 is positioned in the vicinity of the maximum amplitude of the substrate vibration which is excited in the substrate main body 20 by the drive source 11, it is possible to cause the mirror 13 to vibrate at a larger torsion angle.

One method of matching together the vibration modes of the torsion bars 12 and 12 which support the mirror 13 from the respective side is, for example, to place the drive source 11 in the center in the transverse direction (i.e. on the Y axis in FIG. 1) of the substrate main body 20, and to make the distances from the drive source 11 to the left and right torsion bars 12 and 12 be the same.

[Resonance Frequency]

As in Conventional Art 4, as shown in FIG. 1, in order to transmit vibration energy generated at a position away from the mirror 13 as an energy which efficiently generates torsional vibration in the mirror 13, it is necessary to set the resonance frequency (fm) of the mirror 13 which is mainly determined by the mass of the mirror 13 and by the spring constant of the torsion bars 12, considerably away from the resonance frequency (fb) which includes the division oscillation mode of the substrate 10 itself. When the drive source 11 of the optical scanning device is driven so as to match the resonance frequency (fm) of the torsional vibration of the mirror 13, if a resonance mode is also induced in the substrate 10, the vibration energy generated by the drive source 11 becomes distributed between torsional vibration of the mirror 13 and two-dimensional division vibration of the substrate 10, due to the law of conservation of energy. Accordingly, the amplitude (i.e. the torsion angle) of the torsional vibration of the mirror 13 becomes smaller, by the amount of vibration energy from the drive source 11 which is consumed by the two-dimensional division vibration of the substrate 10, resulting in that it becomes impossible to efficiently drive the optical scanning device.

Moreover, if the unnecessary two-dimensional division vibration is induced in the substrate 10, there may be the cases in which a vibration mode other than pure torsional vibration which has the torsion bars 12 as its axis of rotation becomes superimposed on the mirror 13 positioned at the distal end of the substrate 10, resulting in that it becomes impossible to achieve an optical scan having a high level of accuracy in the rectilinear scan performance thereof. In contrast to this, as shown in FIG. 5, Conventional Art 4 is designed such that the torsional resonance frequency a (fm(n), in which n=0, 1, 2, . . . ) which includes elements up to the higher orders induced in the mirror, does not overlap with the torsional resonance frequency b (fb(n), in which n=0, 1, 2, . . . ) which includes elements up to the higher orders induced in the frame.

[Thickness and Area of Film Body of Piezoelectric Film and the Like Forming Drive Source]

The thickness and size of the film body of the piezoelectric film and the like forming the drive source 11 which causes the mirror 13 to vibrate, must be set at the optimum values, in accordance with the thickness and size of the substrate main body 20.

Taking the conditions which the optical scanning device will be used into consideration, based on a constant drive voltage (i.e. voltage applied to the piezoelectric film), the thinner the film body is, the greater the displacement which can be obtained is. In actuality, particularly in a film which is formed using the AD method, the characteristics of a piezoelectric film which is formed on a metal substrate show a dependency on the film thickness, namely, if the film is too thin, there is a deterioration in the piezoelectric characteristics and a deterioration in film characteristics such as an increase in leakage current and the like, while if the film is too thick, polarization processing becomes difficult. Moreover, with respect to the thickness of the substrate 10, when considering the flatness of the mirror when it is in operation and the mirror sizes required for applications such as projector devices, assuming that the substrate is formed from Si or stainless steel, the thickness of 10 μm or greater is at least required. In consideration of these points, the optimum thickness of the film body of the piezoelectric film or the like which is suitable for driving the optical scanning device is 6 times or less than the thickness of the substrate main body 20. A lower limit of the thickness of the film body is approximately 1 μm, and, at this time, it is possible to obtain the maximum mirror scan angle with the minimum drive voltage and power consumption, for a film thickness of the same area.

Moreover, when the area of the piezoelectric film or the like forming the drive source 11 is such that, in the above-described film thickness range, the length of the film body in the direction in which the vibration is transmitted over the substrate, is within a range that is smaller than approximately the ½ wavelength of the vibration which is determined by the resonance frequency for driving the optical scanning device and the acoustic velocity of the substrate material, the driving can be efficiently performed. Furthermore, within this range, when considering power consumption, it is preferable that the area of the drive source 11 is the same as or smaller than the substrate main body 20. More preferably, the area of the drive source 11 is ¾ or less than the area of the substrate main body 20.

[Position of Center of Gravity of Mirror Portion]

When the mounted positions of the torsion bars 12 which support the mirror 13 of the optical scanning device are shifted from the position of the center of gravity of the mirror 13 in a perpendicular direction relative to the axis of the torsion bars 12, as shown in FIG. 6, two resonances f1 and f2 exist, namely, a torsional resonance mode centered on the axis of the bars (i.e. on the X axis), and a torsional resonance mode centered on the position of the center of gravity (Xm) of the mirror 13. At this time, there is a slight difference between the two resonance frequencies f1 and f2, and the amplitude of the angle of the torsional vibration (i.e. the optical scan angle) of the mirror in the vicinity of the resonance frequency is not the same, when the drive frequency approaches the resonance frequency from the low frequency side and when it approaches the resonance frequency from the high frequency side, resulting in a large hysteresis occurred. In actual use, this hysteresis is a big problem. For example, a case might be considered, in which the mechanical constants of the optical scanner are changed by fluctuations in the environmental temperature, which leads to a change in the resonance frequency which, in turn, leads to fluctuations in the optical scan angle. These fluctuations can generally be controlled to compensate, by changing the drive frequency applied to the piezoelectric film 11. However, if the aforementioned hysteresis is present, extremely complex control is required because of the non-linearity of the hysteresis, and such control is not practical. In contrast to this, when the position of the center of gravity of the mirror 13 is matched to the supporting position of the torsion bars 12, the aforementioned hysteresis does not appear, and favorable resonance characteristics can be obtained.

[Cross Section of Torsion Bar]

Preferably, the cross section of the torsion bars 12 supporting the mirror 13 is ideally an axially symmetrical circle. However, in the actual manufacturing thereof, because it is formed from a sheet material, it has a limited width and has a rectangular cross section. Because of this, if the width (W) of the bars is too large, with even a slight processing error, a phenomenon occurs in which the position of the axis of the torsion bars 12 moves within the width (W) of the bars when resonating. Then, as described above, a hysteresis phenomenon occurs in the amplitude of the torsion angle (i.e. the optical scan angle) for drive frequencies in the vicinity of the resonance frequency, resulting in that drive control is difficult. In order to solve this type of problem, it is necessary to keep the width of the torsion bars under a certain width. From experiments, it is found that, with respect to the length of the torsion bars (T1) and the substrate thickness (T2), it is necessary that the W to be within a range of: $W/T1 \leq 0.4$, or $0.05 \leq T2/W \leq 2$; and it is preferable that: $W/T1 \leq 0.2$, or $0.1 \leq T2/W \leq 0.5$.

[Method for Forming Piezoelectric Film]

When an aerosol deposition method is utilized to form the piezoelectric film, because this is a low-temperature and high-speed process, it is possible to readily form a thick film of several micrometers or more directly on a metal substrate or the like in a short period of time. However, the film formation method is not limited to this. For example, when a material having a heat-resistant temperature, such as a Si substrate, is used, then using the usual thin-film technology, such as a sputtering process, CVD process, or sol-gel process, or the like, it is possible to form an epitaxially grown high-performance piezoelectric thin-film. This is useful for forming even more precise micro-optical scanning devices.

[Supporting of a Substrate]

In the substrate 10, when the fixed end 21 of the substrate main body 20 on the opposite side from the mirror 13 side is fixed to and supported in cantilever fashion by the supporting member 16, the torsion amplitude of the mirror 13 can be increased.

In this case, the width of the fixed end 21 which is fixed by means of the supporting member 16, is preferably within a range of 1/20 to ¾ the width of the substrate main body 20, more preferably within a range of 1/10 to ½ the width of the substrate main body 20.

When the width of the fixed end 21 of the substrate main body 20 on the opposite side from the mirror 13 side is made narrower than the width of the substrate main body 20 and this fixed end 21 is fixed to and supported in cantilever fashion by the supporting member 16, it is possible to more efficiently generate vibration in the substrate main body 20 using the drive source 11, and it is possible to increase the torsion amplitude of the mirror 13.

The inventors of the present invention confirmed that the narrower the width of the fixed end 21 is, the greater the torsion angle of the mirror 13 tends to be. In this case, the width of the fixed end 21 which is fixed by means of the supporting member 16 is preferably within a range of 1/20 to ¾ the width of the substrate main body 20. If the width is less than 1/20 the width of the substrate main body 20, this is too narrow from practical aspects, and the fixing becomes unstable, which is impractical.

FIGS. 7(*a*) to 7(*e*) show various substrate shapes.

For example, FIG. 7(*a*) shows a case in which the fixed end 21 is the same as the width of the substrate main body 20. In this case, the torsion angle of the mirror 13 is 35°. On the other hand, as shown in FIGS. 7(*b*), 7(*c*), and 7(*d*), when the overall width of the fixed end 21 is narrower than the width of the substrate main body 20, it is possible to obtain a high torsion angle of the mirror 13 that is 40° or greater, at the same drive voltage.

Moreover, it was found that not only the overall width of the fixed end 21 is important, but also the shape thereof is important as well.

For example, when the width of the fixed end 21 was made smaller, by cutting rectangular notches out of the left and right sides of the substrate main body 20 in the vicinity of the fixed end 21, as shown in FIG. 7(b) (referred to as "H shape"), the torsion angle was 46°. When the width of the fixed end 21 was made smaller, by cutting triangular notches out of the left and right sides of the substrate main body 20 in the vicinity of the fixed end 21, as shown in FIG. 7(c) (referred to as "Y shape"), the torsion angle was 54°. In those cases, it is thus possible to more efficiently generate vibration in the substrate main body 20 with the drive source 11, to increase the torsion amplitude of the mirror 13. Furthermore, in those cases, the overall width of the fixed end 21 is preferably set to ⅛ to ½ the width of the substrate main body 20.

Moreover, placing a part of the fixed end 21 in a center portion of the substrate main body 20 makes it possible to cause the mirror 13 to vibrate at a large torsion angle. For example, when the position of a part of the fixed end 21 was not placed in the center of the substrate main body 20, as shown in FIG. 7(e), the torsion angle of the mirror 13 was 43°. However, when a part of the fixed end 21 was also in a position in the center of the substrate main body 20, as shown in FIG. 7(d) (referred to as "spectacle frame shape"), the torsion angle of the mirror 13 was 54°.

On the other hand, even when the fixed end 21 is the same as the width of the substrate main body 20, by changing the support mode by which the supporting member 16 fixes the fixed end 21 of the substrate main body 20, the fixing stability of the optical scanning device can be further improved.

FIGS. 8(a) to 8(c) show examples of three support modes.

FIG. 8(a) shows an example in which the entire one side face of the substrate main body 20 is supported by the supporting member 16. In this case, the torsion angle of the mirror 13 was 45°.

FIG. 8(b) shows an example in which the entire one side face of the substrate main body 20 and both sides continuous with that are supported by the supporting member 16. In this case, the torsion angle of the mirror was 43°. Because the vibration generated in the substrate main body 20 by the drive source 11 is not very large in each side portions of the substrate main body 20 on the opposite side from the mirror 13 side (see FIG. 12), even if the each side portions of the fixed end 21 are fixed by the supporting member 16, there is substantially no effect on the torsion amplitude of the mirror 13. In the case of FIG. 8(b), because the length fixing the substrate 10 is substantially longer, in actual use, it is possible to further enhance the fixing stability of the optical scanning device. In this case, the angle 8 of the triangle cut into the supporting member 16 is preferably within a range of between 30° and 300°, within a plane.

Further, when a means for fixing the substrate 10 to the supporting member 16 is to clamp the substrate main body 20 from the upper side and the lower side, stable fixing can be attained. However, there are cases in which, when the clamped portion is a flat plane, uniform contact pressure is not applied to the fixed end of the substrate main body, to cause unnecessary resonance, resulting in that sufficient fixing cannot be achieved. Thus, as shown in FIG. 8(c), when the cross-sectional configuration of the clamped portion is formed as curved, slight bending tension acts in the vicinity of the fixed end of the substrate main body 20. As a result, uniform pressure is applied to the contact face between the substrate main body 20 and the supporting member 16, and a more stable fixing is possible by the pressure applied. In experiments, it was found that when the clamped portion was a plane (flat surface), the torsion angle of the mirror 13 was 30°, but in the case of the curved shape as shown in FIG. 8(c), the resonance frequency was stabilized and the torsion angle of the mirror 13 was able to increase to 54°.

The cross-sectional configuration of the clamped portion is not limited to the above-described curved shape, and may also be a triangular configuration in which the substrate main body is slightly bent.

The optical scanning device according to Conventional Art 4 has a basic structure, as shown in FIG. 1, in which the substrate main body 20 is supported in a cantilever fashion by the supporting member 16, on the opposite side from the mirror 13. Because of this, if a vertical disturbance vibration is applied to the entire optical scanning device, the entire optical scanning device vibrates, and optical beams which are reflected and scanned by the mirror 13 are affected by this vibration and do not vibrate stably, to cause a problem that it is not possible to guarantee accurate optical scanning. Accordingly, assuming that the optical scanning device will be used in practical applications, such as in portable devices, it is necessary to improve this instability with the entire optical scanning device having a cantilever structure.

Thus, as shown in FIG. 9, in Conventional Art 4, the optical scanning device is fixed by means of narrow-width substrate connecting bars 23 to a rigid substrate fixing frame 22, which is positioned so as to surround the entire cantilever-supported optical scanning device, at positions separated from the fixed end 21 of the optical scanning device.

At this time, the resonance state of the optical scanning device itself changes depending on the fixing positions of the substrate connecting bars 23, and the scan angle and resonance frequency of the mirror 13 may also be changed according to the change above.

FIGS. 10 and 11 show the results when this state was examined. As shown in FIG. 10(a), when the optical scanning device is fixed by the substrate connecting bars 23 at the base of cantilever beams 12 whose vibration amplitude close to the antinode of the vibration is large when the mirror 13 is in torsional resonance state, the scan amplitude of the mirror 13 is considerably reduced, namely, to approximately 17°, as compared to a scan amplitude of approximately 53° which is obtained when the optical scanning device is not fixed. This is because, if a portion large in the vibration amplitude is fixed at the outer peripheral portion of the optical scanning device, to suppress this vibration, then the vibration mode of the entire substrate 10 of the optical scanning device is changed, which results in it becoming impossible to efficiently transmit energy to the torsional vibration of the mirror 13.

Contrary to the above, in the state, as shown in FIG. 11, in which the substrate main body 20 is not connected to the substrate connecting bars 23, when the mirror 13 is in torsional resonance state, if, as shown in FIG. 10(d), the optical scanning device is connected and fixed by the substrate connecting bars 23, in a portion in the vicinity of a node 25 where a vibration amplitude in the Z axial direction of the edge portion of the substrate 10 of the optical scanning device (i.e. a portion indicated by the reference sign 24 in FIG. 11) is at the minimum, then the scan amplitude of the mirror 13 becomes a slightly larger scan amplitude, namely approximately 55°, than when it is not fixed to the substrate fixing frame 22. In this case, since the vibration mode of the entire substrate 10 of the optical scanning device is not changed, it is possible to maintain a substantially equivalent resonance state, as compared with that when the optical scanning device is not fixed, and any effects on the scan amplitude of the mirror 13 by fixing the substrate 10 of the optical scanning device by the substrate connecting bars 23 become the minimum.

Accordingly, if the optical scanning device is fixed at the outer edge portion of the optical scanning device, by means of the substrate connecting bars 23 at the node of the vibration when the mirror is resonating, or at the point where the vibration amplitude is the smallest and which is also away from the supporting member 16 of the optical scanning device as further as possible, then it is possible to stably support the optical scanning device against any external disturbance vibration, without attenuating the scan amplitude of the mirror 13.

The scan jitter and the scan wobble (i.e. parameters of stability of a beam scanning speed) of optical beam in the optical scanning device according to the above-mentioned Conventional Art 4, were evaluated by a MEMS scanner measurement system (ALT-9A44), manufactured by ALT. As a result, it was found that, while a scan jitter of a conventional silicon MEMS optical scanner (manufactured by Nippon Signal) was Jp-p: 0.2 to 0.3%; irrespective of the fact that the optical scanning device according to the present invention was formed from a metal material, the scan jitter at scan resonance frequencies of 6 kHz, 16 kHz, and 24 kHz was smaller by one factor of magnitude, namely, Jp-p: 0.06% or less. Thus, according to the present invention, it is possible to achieve a high-accuracy optical beam scan corresponding to a conventional polygon mirror-system. Moreover, in the conventional polygon mirror-system, the scan wobble is approximately Wp-p: 30 to 40 seconds, and it is necessary to apply correction with f-Θ lens or the like, to lower the value by one factor of magnitude. Contrary to the above, in the optical scanning device according to Conventional Art 4, the scan wobble is Wp-p: 5 seconds or less, which is a value lower by one factor of magnitude, and it is possible to achieve a highly stable beam scanning speed without a correction lens-system, which makes it possible to reduce size and costs of the device readily. From the above-described measurement results, it is apparent that the optical scanning device according to the present invention makes it possible to obtain a favorably high optical-beam scanning accuracy, which can be used in a laser printer and the like.

CITATION LIST

Patent Literatures

Patent Literature 1: JP-A-11-52278
Patent Literature 2: JP-A-10-197819
Patent Literature 3: JP-A-10-104543
Patent Literature 4: WO 2008/044470

SUMMARY OF INVENTION

Technical Problem

Although reductions in size and costs have been achieved in a simple structure by Conventional Art 4 previously proposed by the applicant/inventors, also in Conventional Art 4, warpage of a polished mirror and a dynamic deformation of the mirror are problematic, as shown in FIG. 12.

The left-side figure in FIG. 12 is a view showing the mirror and the torsion bars taken out, for explanation, and as illustrated in the figure, the center axis in the longitudinal direction of the torsion bars is assumed to be the X axis, and an axis crossing perpendicular to the X axis at the center of the mirror and passing through the mirror face is assumed to be the Y axis. In order to use a metal material for a mirror, the surface roughness of the part utilized as the mirror needs to be a level of several tens of nanometers. For example, when a substrate composed of a mirror, torsion bars, a substrate main body, and cantilever beams is formed from a metal sheet material, the metal sheet material is more difficult to etch in a three-dimensional structure and to partially polish in a specific portion (only the mirror), as compared to Si material, and the entire metal sheet needs to be polished. Thus, warpage occurs in the surface-polished sheet, and consequently warpage indicated in the broken line at the upper right of FIG. 12 viewed from the cross-section along the Y axis occurs in the mirror. As a result, such a problem arises that the flatness of the mirror and the resultant entire optical scanning device is deteriorated, and a horizontal correction is needed for obtaining the flatness of the device. In this connection, both surfaces may be polished in order to suppress this warpage, but it is not readily to manufacture a completely flat sheet by both-surface polishing, which causes costs high.

Further, along the torsion angle, deformation becomes large in the thin sheet mirror when torsionally vibrated at a high-speed, to cause dynamic deformation as indicated in the solid line at the lower right of FIG. 12. The resultant dynamic deformation of the mirror deforms a shape of an optical beam reflected on the mirror in optical scanning, which arises a problem for accurate scanning.

Thus, the present invention has been made in order to solve the above problems, to provide an optical scanning device which uses an unpolished metal sheet, to eliminate or suppress any warpage after polishing and to suppress dynamic deformation of the resultant mirror.

Solution to Problem

The present invention is characterized in that an unpolished metal sheet integrated with a substrate is used for a mirror and torsion bars, in which a Si mirror is attached to the mirror of the unpolished metal sheet, thereby to form the mirror which has no warpage due to polishing, and which is less in dynamic deformation owing to the resultant thick mirror having the sum total of the thickness of the metal sheet mirror and the thickness of the Si mirror.

The present invention provides an optical scanning device, comprising:
 a substrate comprising:
  a substrate main body; and
  two cantilever beams which protrude from the respective side portion of one side of the substrate main body;
 a mirror supported by torsion bars from the respective side, between the two cantilever beams;
 a drive source provided on a portion of the substrate main body, for vibrating the substrate; and
 a light source to project light onto the mirror,
wherein a fixed end of the substrate main body is fixed to a supporting member, on the opposite side from the mirror side,
wherein the mirror resonantly vibrates in accordance with vibration applied to the substrate by the drive source, thereby to change a direction of reflection light of the light projected onto the mirror from the light source in accordance with the vibration of the mirror,
characterized in that the substrate, the torsion bars, and the mirror are formed of an integrated sheet, and that a Si mirror is attached to and fixed on the mirror.

Further, the present invention provides an optical scanning device, comprising:
a substrate comprising:
a substrate main body; and
two cantilever beams which protrude from the respective side portion of one side of the substrate main body;
a mirror supported by torsion bars from the respective side, between the two cantilever beams;
a drive source provided on a portion of the substrate main body, for vibrating the substrate; and
a light source to project light onto the mirror,
wherein a fixed end of the substrate main body is fixed to a supporting member, on the opposite side from the mirror side,
wherein the mirror resonantly vibrates in accordance with vibration applied to the substrate by the drive source, thereby to change a direction of reflection light of the light projected onto the mirror from the light source in accordance with the vibration of the mirror,
characterized in that the substrate, the torsion bars, and the mirror are formed of an integrated sheet, and that a Si mirror of a large area is attached to and fixed on the mirror of a small area via an intermediate layer.

Further, the present invention provides an optical scanning device, comprising:
a substrate comprising:
a substrate main body; and
two cantilever beams which protrude from the respective side portion of one side of the substrate main body;
a mirror supported by torsion bars from the respective side, between the two cantilever beams;
a drive source provided on a portion of the substrate main body, for vibrating the substrate; and
a light source to project light onto the mirror,
wherein a fixed end of the substrate main body is fixed to a supporting member, on the opposite side from the mirror side,
wherein the mirror resonantly vibrates in accordance with vibration applied to the substrate by the drive source, thereby to change a direction of reflection light of the light projected onto the mirror from the light source in accordance with the vibration of the mirror,
characterized in that the substrate, the torsion bars, and the mirror are formed of an integrated sheet, that a recess is formed at a position where a Si mirror is attached to the mirror, and that the Si mirror is attached to and fixed on the recess.

Further, the present invention provides an optical scanning device, wherein the Si mirror is attached to and fixed on one face or the respective face of the mirror.

Advantageous Effects of Invention

The present invention can exhibit such the excellent advantageous effects as described below.

According to the present invention, since an unpolished metal sheet integrated with the substrate is used for the mirror and the torsion bars, no warpage due to polishing occurs, and since the Si mirror is attached to the mirror, the thickness of the mirror becomes thick, thereby suppressing dynamic deformation.

Further, by attaching the Si mirror of a large area to the metal sheet mirror of a small area via the intermediate layer, the same length of the torsion bars can be ensured in a small size.

Further, by employ the metal sheet mirror of a beam structure, it is possible to accurately set the position of the Si mirror to be attached thereto.

DESCRIPTION OF EMBODIMENTS

One feature of the present invention resides in the structure in which an unpolished metal sheet integrated with the substrate is used for the mirror and the torsion bars, and in which the Si mirror is attached to the mirror of the unpolished metal sheet, thereby to eliminate warpage of the mirror due to polishing, and to suppress dynamic deformation of the mirror.

The optical scanning device according to the present invention will be described below, with reference made to the drawings.

EXAMPLES

Example 1

Figure 1:
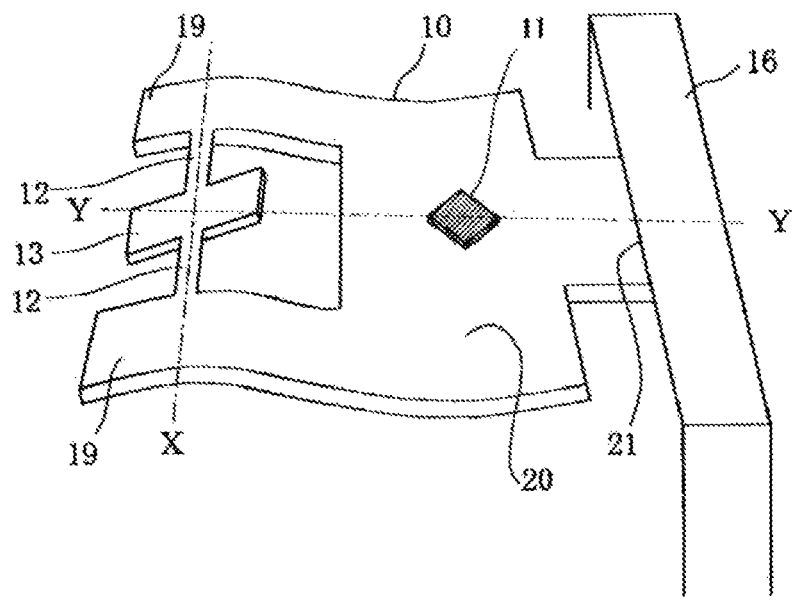
FIG. 1 is a conceptual view illustrating fundamental matters of the optical scanning device.
Figure 2:
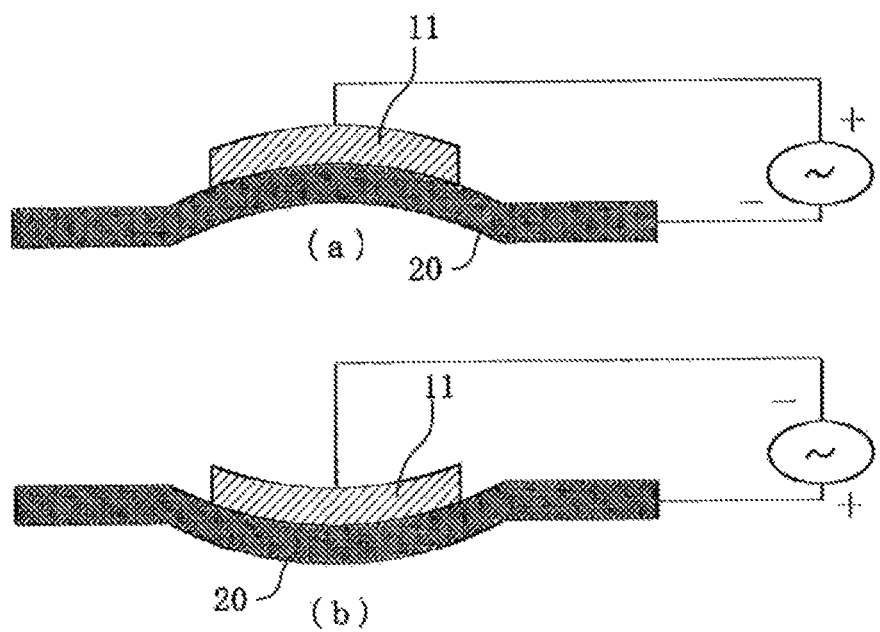
FIGS. 2(a) and 2(b) are conceptual views illustrating the vibration generation principle in the optical scanning device.
Figure 3:
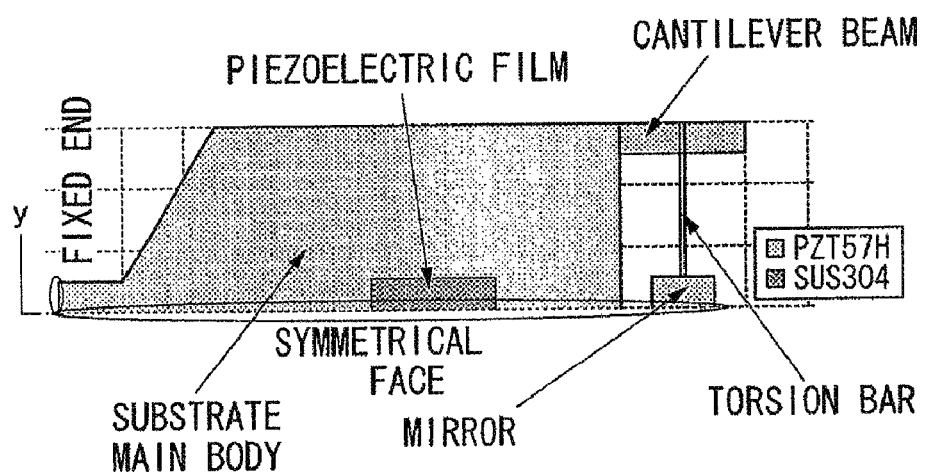
FIG. 3 is a plan view of the optical scanning device which has a structure in which a single piezoelectric film is formed on the substrate main body, with a face where y=0 being taken as a plane of symmetry, and with a half of this being used as a model.
Figure 4:
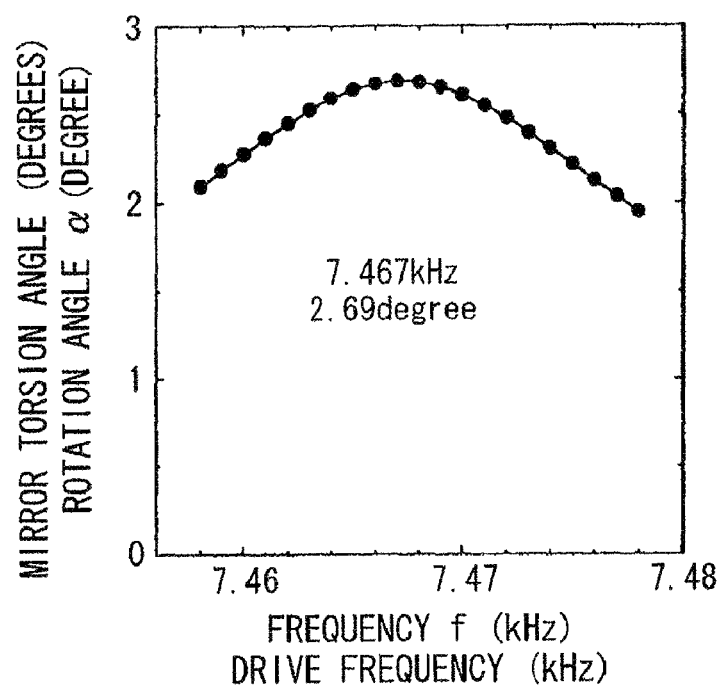
FIG. 4 is a graph showing the torsion angle of the mirror of the device shown in FIG. 3.
Figure 5:
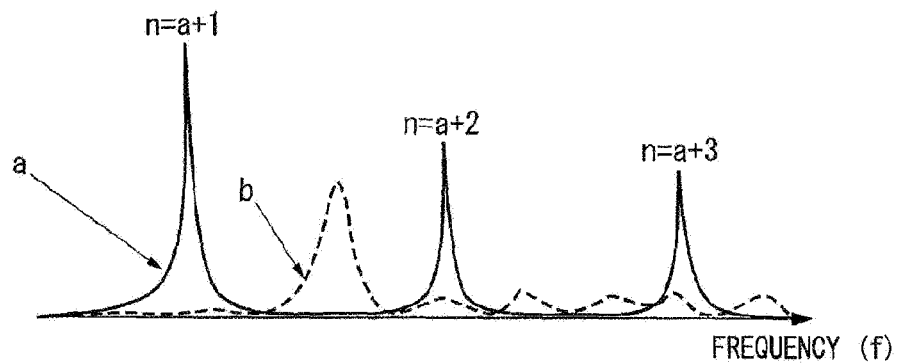
FIG. 5 is a view showing resonance frequencies of the substrate and the mirror of the optical scanning device.
Figure 6:
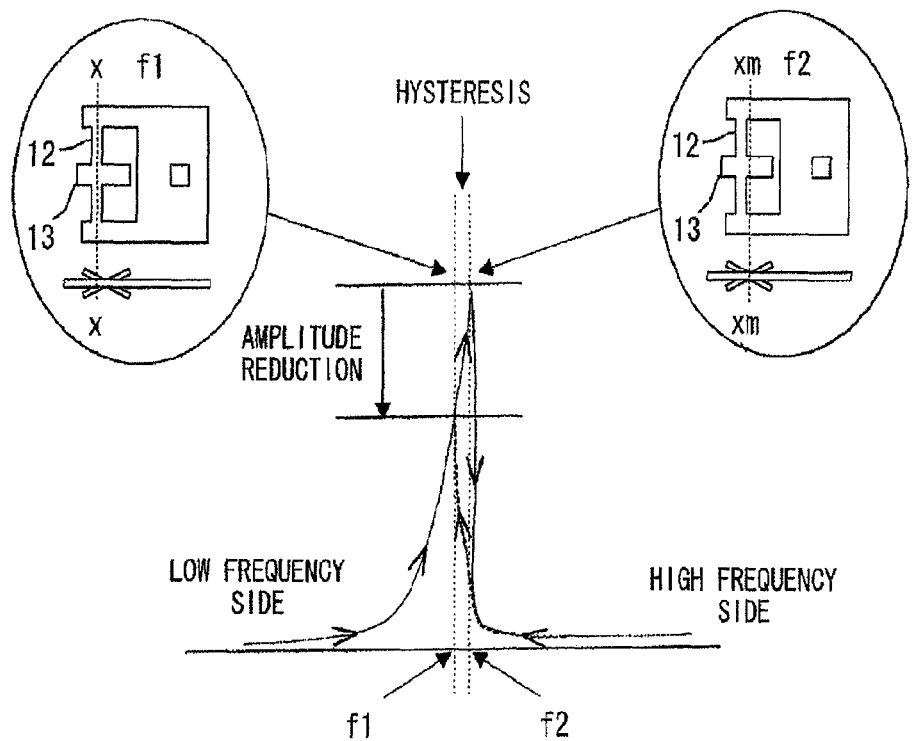
FIG. 6 is a view illustrating circumstances in which a large hysteresis is generated, in the case where the center of gravity of the mirror is shifted in the vertical direction relative to the axis of the torsion bars, between when the drive frequency approaches the resonance frequency from the low-frequency side, and when the drive frequency approaches the resonance frequency from the high frequency side.
Figure 7:
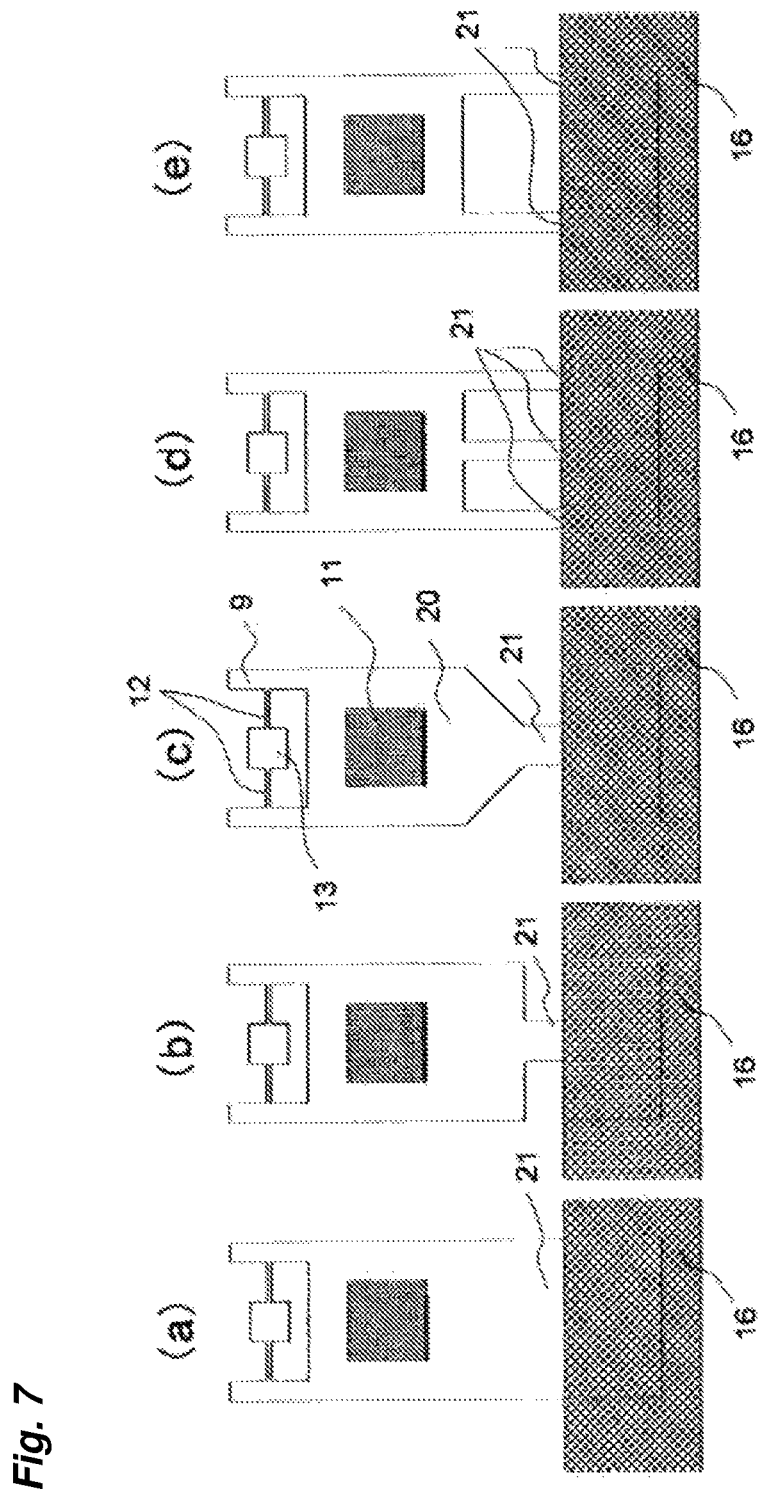
FIGS. 7(a) to 7(e) are views showing various shapes of the substrate.
Figure 8:
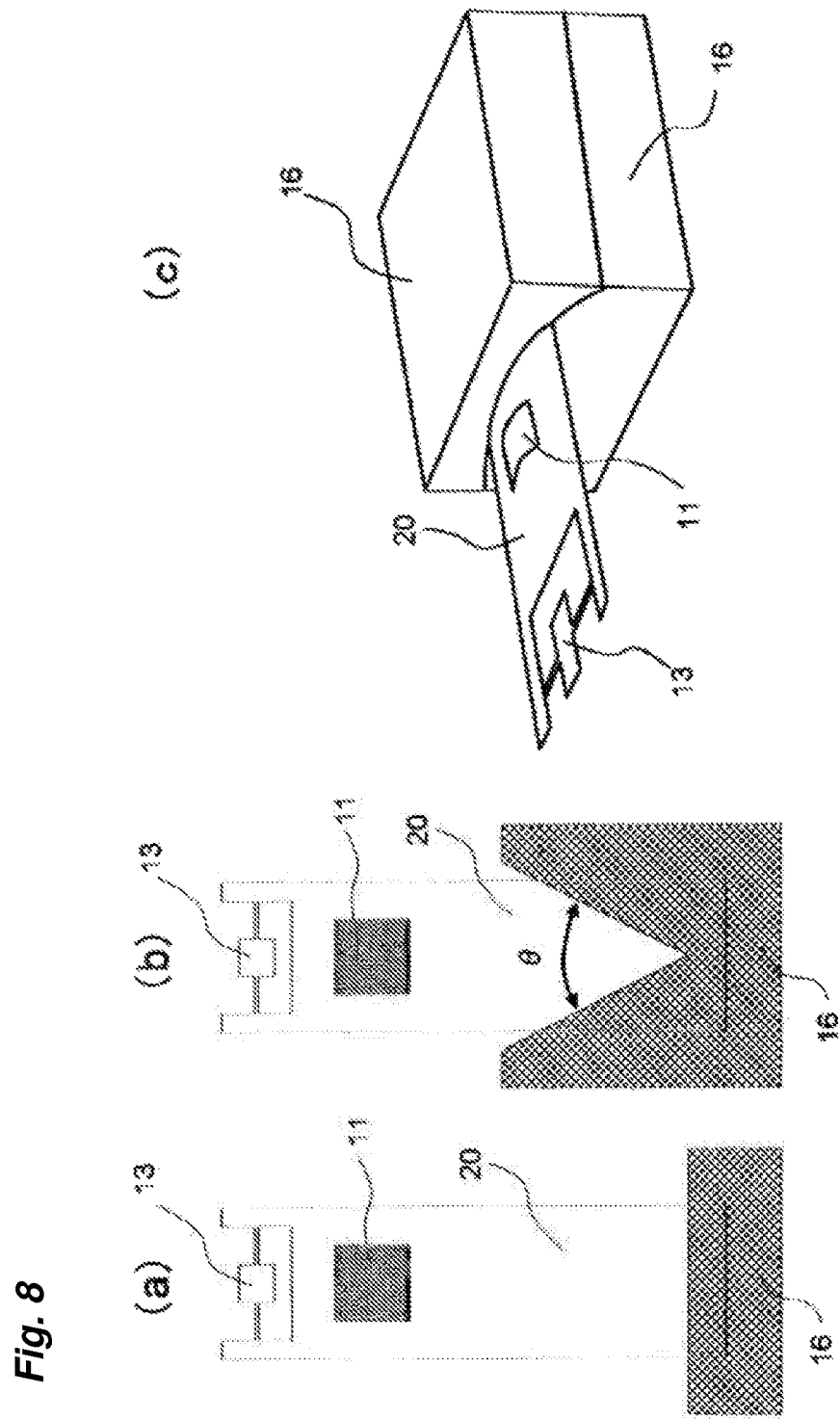
FIGS. 8(a) to 8(c) are views showing three examples of substrate supporting modes.
Figure 9:
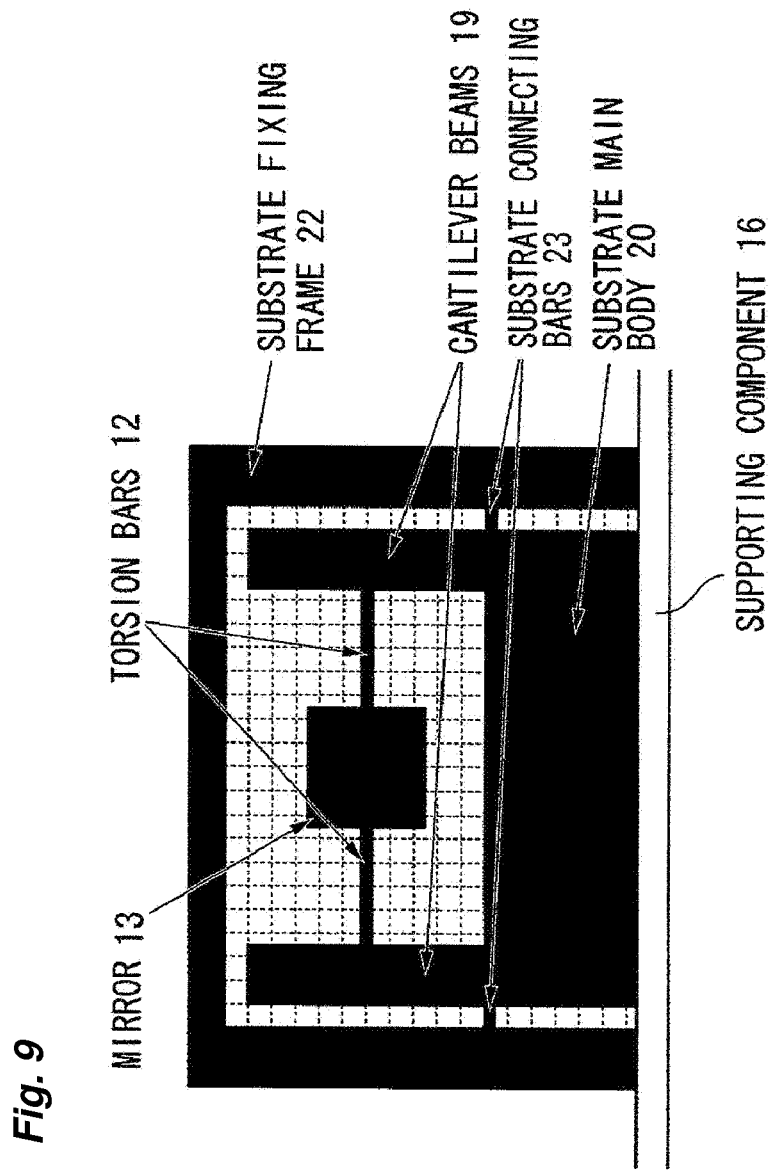
FIG. 9 is a plan view of the optical scanning device in which the substrate fixing frame is positioned so as to surround the substrate main body and the cantilever beams of the device.
Figure 10:
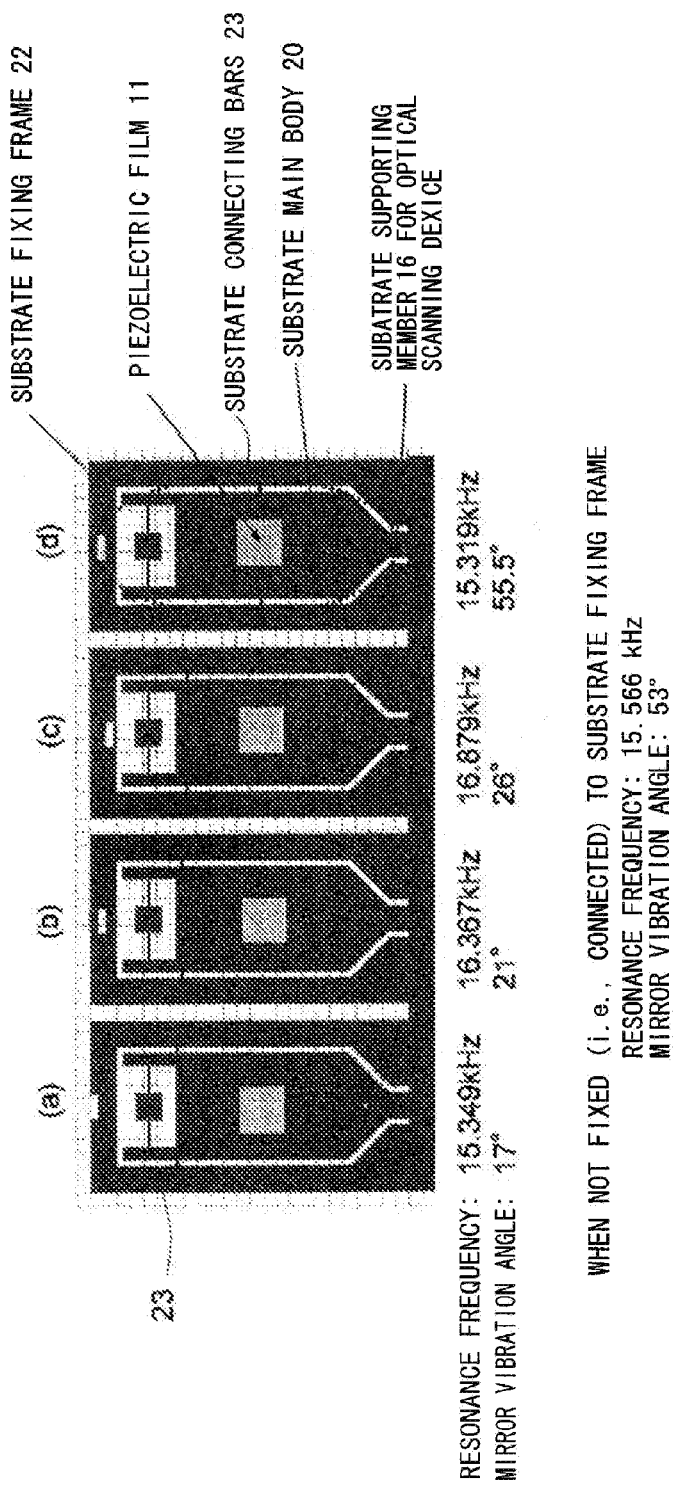
FIGS. 10(a) to 10(d) are views illustrating mirror torsion angles when the positions of the substrate connecting bars which connect the substrate and the substrate fixing frame together are changed.
Figure 11:
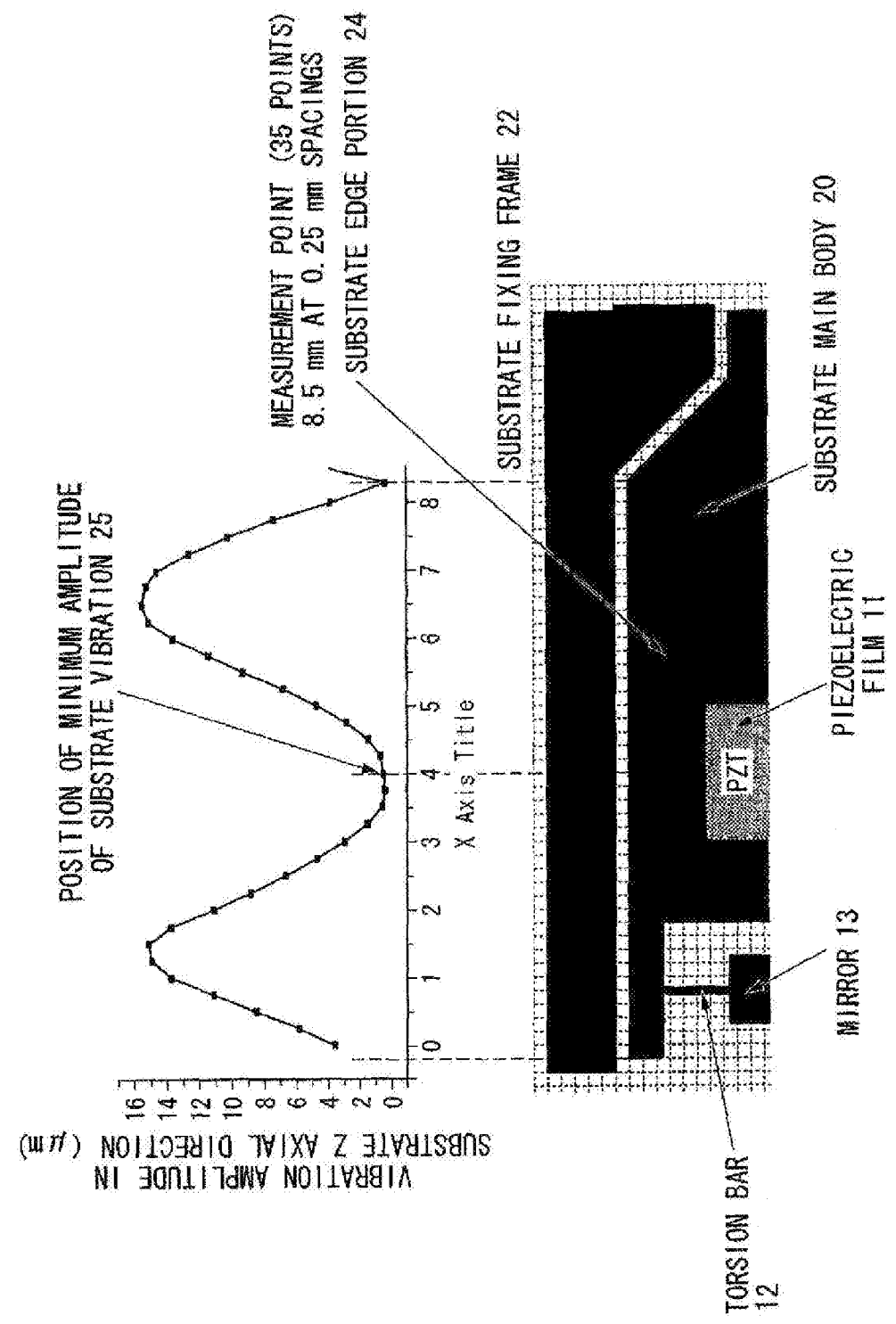
FIG. 11 is a view illustrating a state of the vibration amplitude of an edge portion of the substrate, when the mirror is in torsional resonance state, under the state in which the substrate and the substrate fixing frame are not connected together by the substrate connecting bars.
Figure 12:
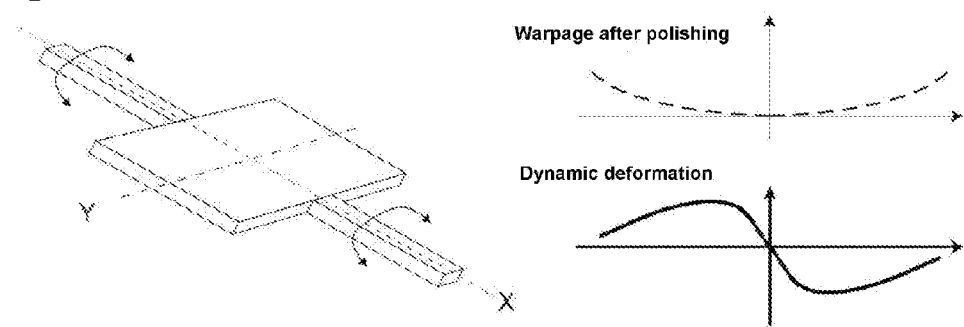
FIG. 12 is an enlarged view on the mirror and the torsion bars, illustrating warpage of the polished mirror and dynamic deformation of the mirror.
Figure 13:
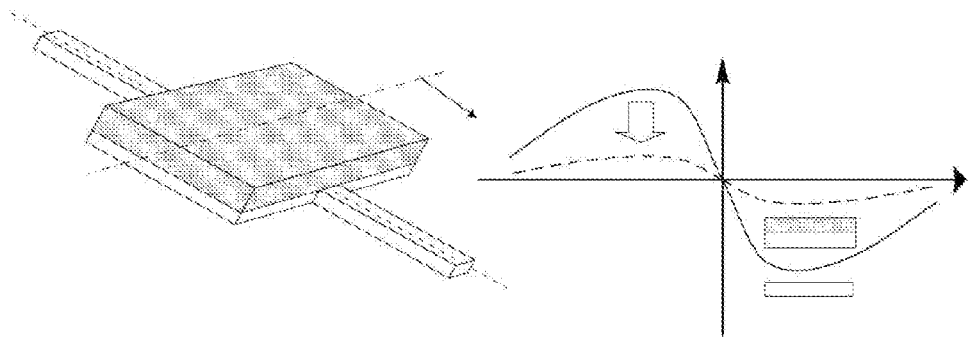
FIG. 13 are views showing an example according to the present invention, illustrating suppression of the dynamic deformation.

FIG. 13 is a view showing one example according to the present invention, in which the mirror and the torsion bars are enlarged. In the left-side view of FIG. 13, the mirror is composed of an unpolished metal sheet integrated with the torsion bars and the substrate, and the Si mirror is attached to and fixed on the mirror of the metal sheet. By taking the thus-attached structure, such an unpolished metal sheet can be used, to eliminate an affection of warpage in a case where the metal sheet would be polished. Since the Si mirror is attached to and fixed on the metal mirror and thus the thickness of the resultant mirror becomes thick, dynamic deformation can be suppressed, as shown in the right-side view of FIG. 13. In the right-side view of FIG. 13, the broken line indicates dynamic deformation of the mirror in the case where the Si mirror is attached to the metal mirror, while the solid line indicates dynamic deformation of only the mirror of the metal sheet in the case where no Si mirror is attached to the metal mirror It can be seen that the dynamic deformation can be suppressed when the Si mirror is attached to the metal mirror.

FIG. 13 shows an example in which the Si mirror is attached to one face, but the Si mirror may be attached to and fixed on the respective face.

Further, by forming slits on the respective side of roots of the torsion bars of the metal sheet mirror, the length of the torsion bar can be substantially made longer, thereby to reduce the entire size of those elements.

Example 2

Figure 14:
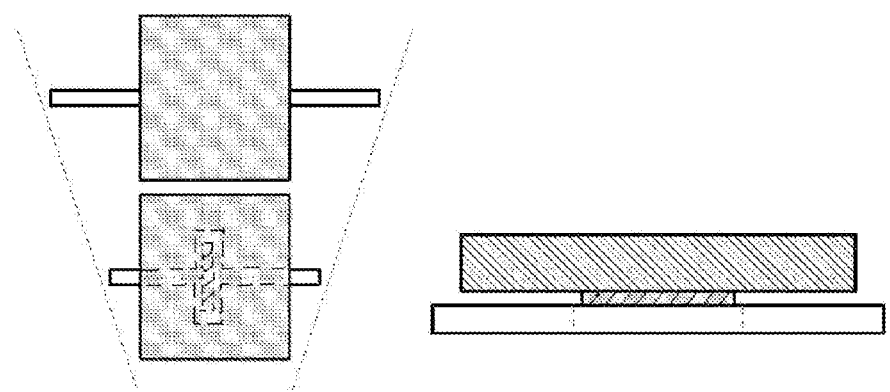
FIG. 14 are views showing another example according to the present invention.

FIG. 14 shows another example according to the present invention, which is different from the example shown in FIG. 13 in that a large-area Si mirror is attached to a small-area metal sheet mirror via an intermediate layer. In the left-side view of FIG. 14, the upper part shows the case where the Si mirror of the same area is attached to the metal mirror, as in the example of FIG. 13, and the lower part shows the case where the Si mirror of a larger area is attached to the metal sheet mirror of a smaller area via the intermediate layer, according to this Example 2. The right-side view is a cross-sectional view when the Si mirror of a larger area is attached to the metal sheet mirror of a smaller area via the intermediate layer.

With such a structure, the same length of the torsion bar can be ensured, in a small size. Furthermore, a large Si mirror can be employed, and the dynamic deformation can be improved with a thicker Si mirror.

Also in this example, the Si mirror may be attached to and fixed on the respective face.

Example 3

Figure 15:
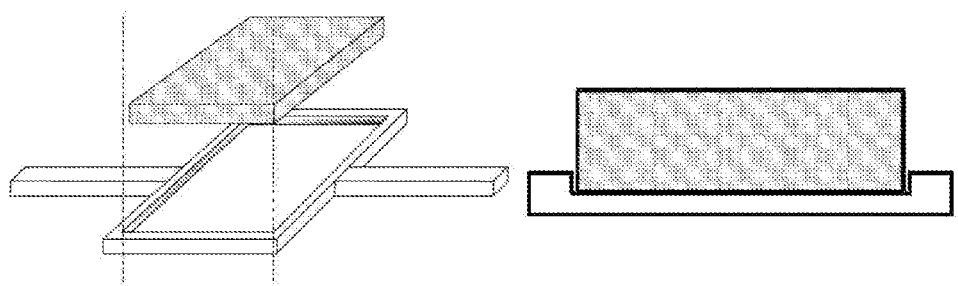
FIG. 15 are views showing still another example according to the present invention.
Figure 16:
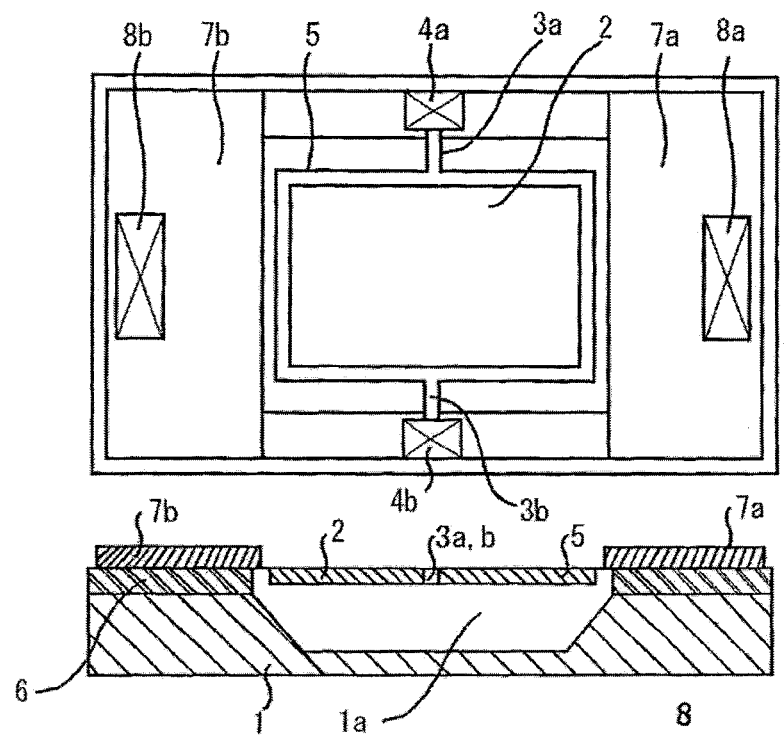
FIG. 16 are views showing Conventional Art 1, with the upper figure in FIG. 16 being a plan view and the lower figure in FIG. 16 being a frontal cross-sectional view thereof.
Figure 17:
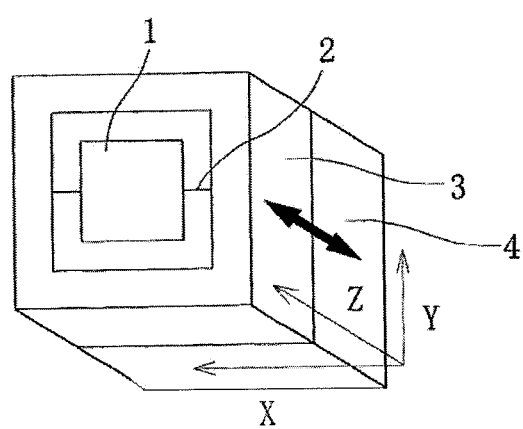
FIG. 17 is a perspective view showing Conventional Art 2.
Figure 18:
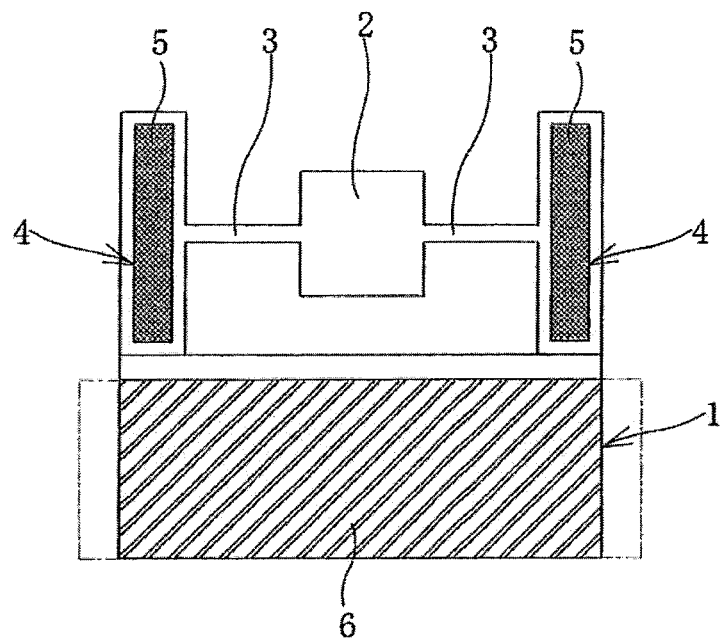
FIG. 18 is a plan view showing Conventional Art 3.
Figure 19:
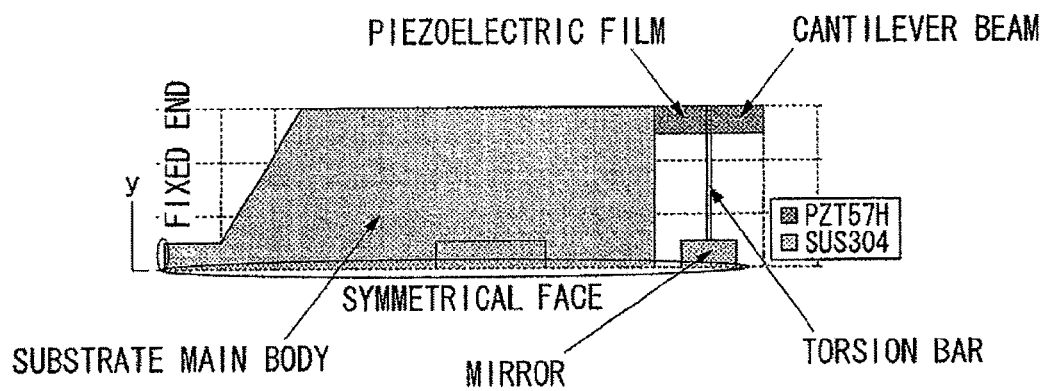
FIG. 19 shows the same type of structure as in the case of Conventional Art 3, with a face where y=0 being taken as a plane of symmetry, and with a half of this being used as a model.
Figure 20:
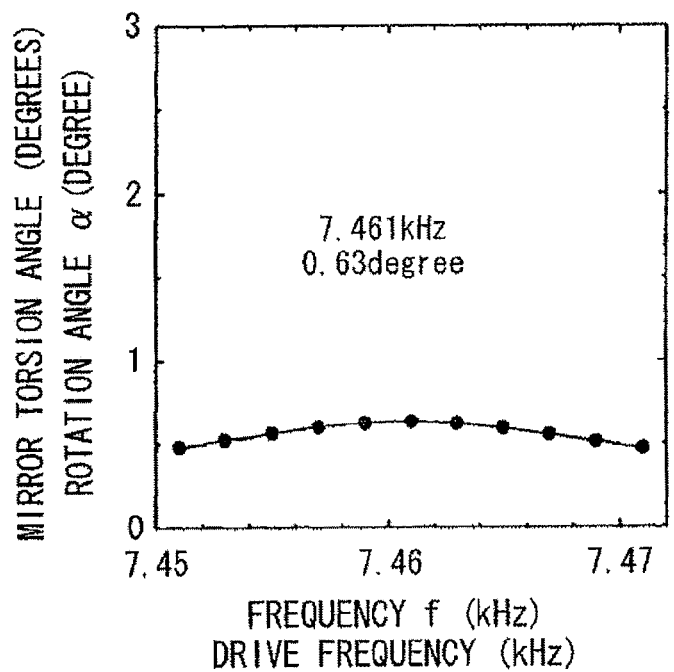
FIG. 20 is a graph showing a torsion angle of the mirror of the device having the structure shown in FIG. 19.

FIG. 15 shows still another example, which is different from the example of FIG. 13 in that half etching is conducted on the position where the Si mirror is to be attached on the metal sheet mirror, to provide a recess. With such a structure, the Si mirror can be readily and accurately positioned in attaching, and a dynamic deformation can be improved with a thicker Si mirror. The mass of the entire mirror can be lightened with half etching, and an oscillation frequency can be widely designed.

Also in this example, the recesses can be provided on the respective face and the Si mirror may be attached to and fixed on the respective face.

INDUSTRIAL APPLICABILITY

The present invention is made to have such a configuration in which a Si mirror is attached to a vibrating mirror in the optical scanning device for scanning an optical beam, but any vibrating mirror for scanning an optical beam is applicable.

REFERENCE SIGNS LIST

10 Substrate
11 Piezoelectric film
12 Torsion bar
13 Mirror
14 Upper electrode
15 Power source
16 Supporting member
17 Laser beam
18 Laser light
19 Cantilever beam
20 Substrate main body
21 Fixed end
22 Substrate fixing frame
23 Substrate connecting bar
24 Edge portion of the substrate

The invention claimed is:

1. An optical scanning device, comprising:
   a substrate comprising:
      a substrate main body; and
      two cantilever beams which protrude from one side of the substrate main body;
   a torsion bar extending from each cantilever beam;
   a mirror supported by the torsion bars, the mirror being between the two cantilever beams;
   a drive source provided on a portion of the substrate main body, to vibrate the substrate; and
   a light source to project light onto the mirror,
   wherein the substrate, the torsion bars, and the mirror are formed of a metal sheet, and
   wherein a Si mirror is attached to and fixed on the metal sheet of the mirror.

2. The optical scanning device according to claim 1, wherein the metal sheet is an unpolished metal sheet.

3. The optical scanning device according to claim 1, wherein the Si mirror has an area larger than the metal sheet of the mirror and is attached to and fixed on the metal sheet of the mirror via an intermediate layer.

4. The optical scanning device according to claim 1, further comprising a recess formed at a position,
   wherein the Si mirror is attached to and fixed at the recess.

5. The optical scanning device according to claim 1, wherein each cantilever beam has a first end attached to the substrate main body and a second free end.

* * * * *